United States Patent [19]

Gollan

[11] Patent Number: 4,898,670

[45] Date of Patent: Feb. 6, 1990

[54] CARTRIDGE BONDING

[75] Inventor: Arye Z. Gollan, Needham, Mass.

[73] Assignee: A/G Technology Corporation, Needham, Mass.

[21] Appl. No.: 59,583

[22] Filed: Jun. 8, 1987

Related U.S. Application Data

[63] Continuation of Ser. No. 745,783, Jun. 17, 1985, abandoned.

[51] Int. Cl.$^4$ .............................................. B01C 13/00
[52] U.S. Cl. .................................. 210/232; 210/321.8; 210/450
[58] Field of Search ................ 55/16, 158; 210/321.8, 210/321.9, 321.81, 450, 236, 232

[56]  References Cited

U.S. PATENT DOCUMENTS

| | | | |
|---|---|---|---|
| 3,616,928 | 11/1971 | Rosenblatt | 55/158 X |
| 3,712,473 | 1/1973 | Ellenburg | 210/321.1 |
| 4,179,380 | 12/1979 | Amicel et al. | 55/158 X |
| 4,237,596 | 12/1980 | Hughes et al. | 55/158 X |
| 4,396,510 | 8/1983 | Hsei | 210/450 X |

Primary Examiner—Frank Spear
Attorney, Agent, or Firm—Charles Hieken

[57] ABSTRACT

Membrane fibers extend into a potting compound that seals an end of the housing formed with openings in which the potting compound is seated, or through which a reinforcing pin passes. The end of the housing may be overlapped by a stepped portion of the potting compound.

3 Claims, 1 Drawing Sheet

CARTRIDGE BONDING

This is a continuation of SN 745,783, filed 6/17/85, now abandoned.

The present invention relates in general to bonding to a housing and more particularly concerns novel apparatus and techniques for bonding membranes to a plastic or metal housing in a manner that reduces the chances of failure at the potting compound/housing interface.

In potting hollow fiber membranes into a plastic or metal housing poor adhesion may occur at the interface between the potting compound and housing. This failure mode is more likely to occur at high temperature because of the different thermal expansion coefficients of the potting compound and housing material. The problem is especially serious when the structures are subjected to repeated autoclave cycles subjecting the structures to tempreature cycling typically between 121° to 126° C. and room temperature.

A search of the prior art uncovered U.S. Pat. Nos. 3,619,459, 3,884,814, 3,909,218, 4,031,012, 4,108,764, 4,179,380, 4,261,829, 4,334,993, 4,349,440, 4,378,981 and Japanese Pat. 59-42006 in searching subclasses 16 and 158 of class 55 and subclass 321 of class 210.

It is an important object of this invention to provide improved methods and means for bonding while maintaining the seal between potting compound, membrane and housing over a relatively wide range of temperatures for structures subject to repeated temperature cycling.

According to the invention, there is means including a region coextensive with the housing wall for receiving potting compound for mechanically locking the potting compound to the housing. According to one aspect of the invention one or more reinforcing pins pass through housing wall openings and the potting compound. According to another aspect of the invention the housing end mates with a circumferential step of the end of the potting compound. Numerous other features, objects and advantages of the invention will become apparent from the following specification when read in connection with the accompanying drawing in which:

Figure 1:
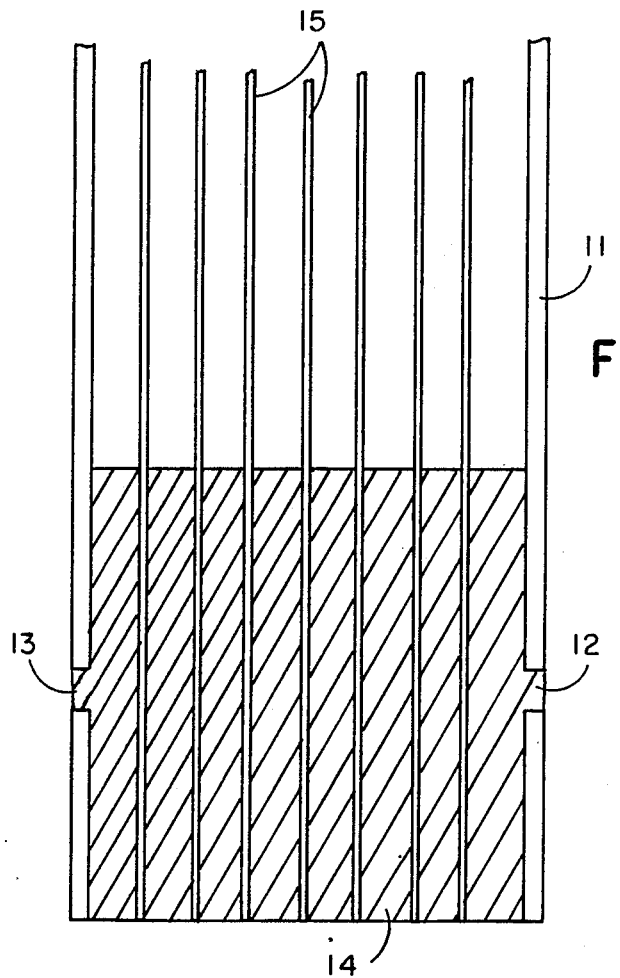
FIG. 1 is a fragmentary axial sectional view of an embodiment of the invention with holes in the housing for receiving potting compound and mechanically locking the compound to the housing.
Figure 4:
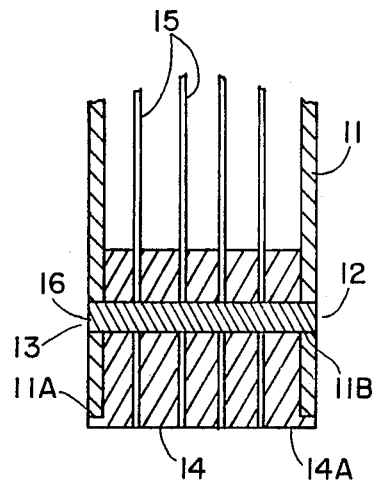

Wtih reference now to the drawing and more particularly FIG. 1 thereof, there is shown a fragmentary axial sectional view of an embodiment of the invention. Housing 11 of substantially uniform inside diameter is formed with openings such as 12 and 13 near the end for receiving potting compound 14 in which the ends of membrane fibers such as 15 are seated. The potting compound seated in openings 12 and 13 mechanically lock the potting compound to the housing to maintain a good seal between potting compound and housing over a relatively wide range of temperatures.

Figure 2:
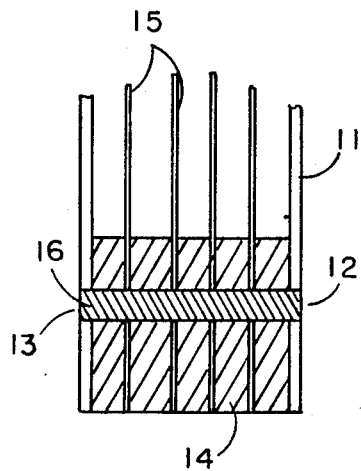
FIG. 2 is a fragmentary axial sectional view of another embodiment of the invention showing a reinforcing pin passing through diametrically opposed openings in the housing and the potting compound.

Referring to FIG. 2, there is shown a fragmentary axial sectional view of another embodiment of the invention in which a pin 16 passes through openings 12 and 13 and potting compound 14. In this embodiment reinforcing pin 16 mechanically locks potting compound 14 to housing 11.

Figure 3:
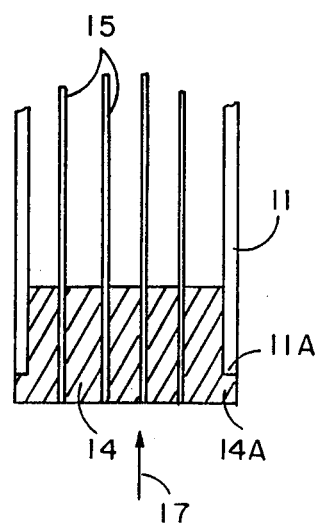
FIG. 3 is a fragmentary axial sectional view of a third embodiment of the invention using mating steps at the end of the housing and potting compound for establishing mechanical locking.

Referring to FIG. 3, there is shown a fragmentary axial sectional view of another embodiment of the invention in which the potting compound is stepped over the end edge 11A of housing 11 engaged by step 14A of potting compound 14. This structural arrangement is satisfactory and advantageous in applications where pressure indicated by arrow 17 is directed against the exposed edge of potting compound 14, such as when housing 11 is evacuated.

The mechanical locking techniques according to the invention are applicable to any set of potting compound/housing material combination. Typical potting compounds include epoxy, urethane, silicone rubber and hot melt glues. Typical housing materials include polycarbonate, polysulfone, polyacrylate, PVC, polybutyrate and stainless steel. An actual embodiment of the invention used an epoxy potting compound and polycarbonate housing with hollow fiber membranes embedded in the potting compound. Other membrane configurations, such as flat sheet membrane could be used in accordance with the invention.

Numerous modifications of the specific techniques and apparatus may be practiced. For example there may be virtually any number of openings in the housing and a number of reinforcing pins. The structures of FIGS. 1, 2 and 3 may be combined in a single structure.

To test the effectiveness of the invention, a series of cartridge assemblies corresponding substantially to the structure shown in FIG. 1 were subjected to repeated heated and cooling extremes from −10° C. to 126° C. These assemblies survived six cycles of these temperature extremes and alternate long term exposures in ice water and boiling water.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In an assembly of a housing with a wall of substantially uniform inside diameter for a structure sealed with a potting compound engaging the inside of said wall inside said housing, the improvement comprising, mechanical locking means for mechanically locking said potting compound to said housing and extending into a region coextensive with the housing wall, said housing having an end edge perpendicular to the axis of said housing adjacent to said region with said mechanical locking means comprising a portion of said potting compound extending over and contacting said end edge with the axial length of said region being less than the axial length of that portion of said potting compound contacting the inside surface of said wall, said structure comprising a hollow fiber membrane potted to said housing by said potting compound and extending through the axial length of both portions of said potting compound.

2. In an assembly of a housing with a wall of substantially uniform inside diameter for a structure sealed with a potting compound, the improvement comprising,
   mechanical locking means for mechanically locking said potting compound to said housing and extending into a region coextensive with the housing wall,
   wherein said housing is formed with openings and said mechanical locking means comprises,
   at least one reinforcing pin extending through said openings and said potting compound,
   said structure comprising a membrane potted to said housing by said potting compound wherein said membrane is a hollow fiber membrane.

3. In an assembly of a housing with a wall of substantially uniform inside diameter for a structure sealed with a potting compound engaging the inside of said wall inside said housing, the improvement comprising,
   mechanical locking means for mechanically locking said potting compound to said housing and extending into a region coextensive with the housing wall,
   said housing having an end edge perpendicular to the axis of said housing adjacent to said regional formed with a plurality of openings in said wall with said mechanical locking means comprising at least one of a portion of said potting compound extending over and contacting said end edge, and a portion of said potting compound extending into said openings,
   said structure comprising a hollow fiber membrane potted to said housing by said potting compound and extending through the axial length of said potting compound.

* * * * *